Feb. 6, 1962  M. BESSARAB  3,020,446
MAGNETRON CIRCUIT APPARATUS
Filed May 21, 1958  5 Sheets-Sheet 1

INVENTOR:
MICHAEL BESSARAB,
BY Philip R. Schlemp
HIS ATTORNEY.

Feb. 6, 1962 M. BESSARAB 3,020,446
MAGNETRON CIRCUIT APPARATUS
Filed May 21, 1958 5 Sheets-Sheet 3

INVENTOR:
MICHAEL BESSARAB,
BY Philip R. Schlenp
HIS ATTORNEY.

Feb. 6, 1962 M. BESSARAB 3,020,446
MAGNETRON CIRCUIT APPARATUS
Filed May 21, 1958 5 Sheets-Sheet 4

INVENTOR:
MICHAEL BESSARAB,
BY HIS ATTORNEY.

United States Patent Office 3,020,446
Patented Feb. 6, 1962

3,020,446
MAGNETRON CIRCUIT APPARATUS
Michael Bessarab, Schenectady, N.Y., assignor to General Electric Company, a corporation of New York
Filed May 21, 1958, Ser. No. 736,867
16 Claims. (Cl. 315—39.71)

My invention relates generally to interdigital magnetrons and pertains more particularly to voltage tunable magnetron circuit apparatus including magnetron circuitry and means for providing the required magnetic field for magnetron operation.

Interdigital magnetrons, such for example as the voltage tunable type disclosed and claimed in U.S. Patent No. 2,810,096 to P. H. Peters, Jr., et al. and U.S. Patent No 2,930,933 of G. J. Griffin et al., both assigned to the same assignee as the present invention, are often employed in providing radio frequency power to a load through a coaxial line. This requires the provision of circuitry adapted for making a transition from the spaced anode contacts of the magnetron to the conductors of the coaxial line, and it is often desirable that this transition be accomplished with maximum efficiency or substantial average power output over a substantially wide operating frequency range.

Further, voltage tunable magnetrons require a magnetic field of substantial strength and also require that the flux lines of this field be predeterminedly positioned relative to the longitudinal axis of the magnetron in order to operate satisfactorily. Also, in many applications, space for the magnet is at a premium and weight is a major factor in determining acceptability of circuit apparatus including the magnet. Accordingly, it is desirable to provide magnetron circuit apparatus including means for insuring an adequately strong magnetic field and positioning and maintaining that field in a predetermined desired relation to the magnetron. It is also desirable that the magnet arrangement of the circuit be light and have as small a space requirement as possible.

Still further, voltage tunable magnetrons are generally physically small and operate at relatively high temperatures and require for operation various widely different direct current potentials on the several electrodes thereof. Thus, it is desirable to provide direct current connecting means which are physically small and adapted for making satisfactory electrical contacts with the various contact elements of the tube without danger of electrical breakdown between elements of different potentials and without danger of failure of tube seals due to overheating. Also, it is desirable to minimize radio frequency losses through the direct current leads.

Accordingly, a primary object of the present invention is to provide new and improved magnetron circuit apparatus adapted for increasing the practical applications of electric discharge devices of the magnetron type.

Another object of the present invention is to provide interdigital magnetron circuitry including improved output means adapted for affording increased efficiency of power transfer over a substantially wide operating frequency range.

Another object of the present invention is to provide interdigital magnetron circuitry apparatus including an improved magnet holding and adjusting means for obtaining and retaining desired positional relationships between the required magnetic field and magnetron, thereby to increase the operating efficiency of the magnetron.

Another object of the present invention is to provide interdigital magnetron circuitry apparatus including improved means for making required direct current connections to the electrodes of the magnetron.

Another object of the present invention is to provide an improved voltage tunable magnetron circuit comprising a single package which can be physically small and compact without compromising any of the requirements for satisfactory high-efficiency electrical operation.

Further objects and advantages of my invention will become apparent as the following description proceeds and the features of novelty which characterize my invention will be pointed out with particularity in the claims annexed to and forming part of this specification.

In carrying out the objects of my invention I provide magnetron circuitry apparatus including a ridged waveguide circuit having an interdigital magnetron fixedly mounted therein. The waveguide circuit is positioned in a magnet such as to dispose the magnetron between opposed closely spaced pole pieces of the magnet. The magnet is fitted in a holder which carries adjustment screws for adjustably positioning the waveguide circuit in the magnet, thereby to position adjustably the magnetron in the circuit relative to the magnetic field between the pole pieces. Electrical connectors for making direct current connections to the various electrode contacts of the magnetron which are positioned between the magnetron ends and magnetic pole pieces are provided and are adapted for fitting in the limited space available therefor between the magnetron and pole pieces. These connectors are also adapted for withstanding substantial operating temperatures for avoiding electrical breakdown between electrical contacts of substantial potential differences and for avoiding damage to the tube seals from overheating. Power transfer efficiency is obtained by constructing the waveguide circuit so as to afford an impedance characteristic which is capacitive over the entire operating frequency range of the circuit. Additionally, improved magnetron operation and power transfer efficiency is obtained by shaping the pole pieces therefor so as to provide substantial magnetic field components extending transverse the longitudinal axis of the magnetron.

For a better understanding of my invention reference may be had to the accompanying drawing in which.

Figure 1:
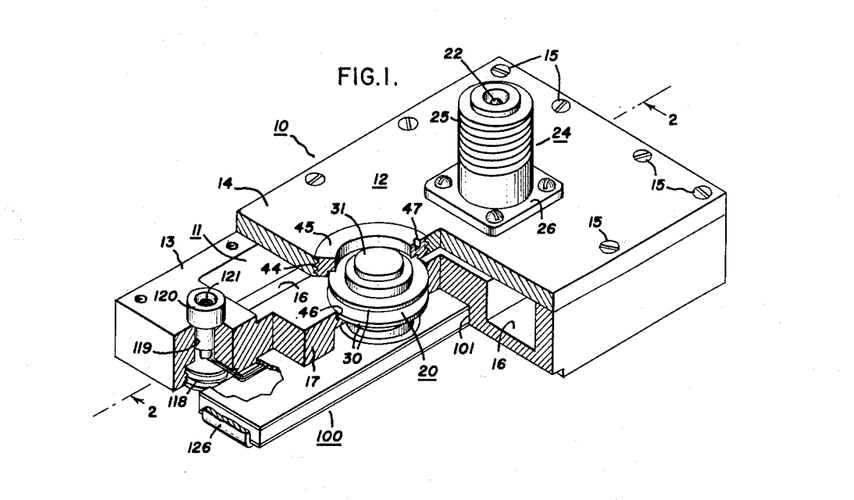
FIGURE 1 is a perspective illustration of the waveguide circuit which is partially sectionalized to illustrate the construction of the ridged waveguide region of the circuit, the magnetron mounting means, and portions of the direct current connectors.
Figure 2:
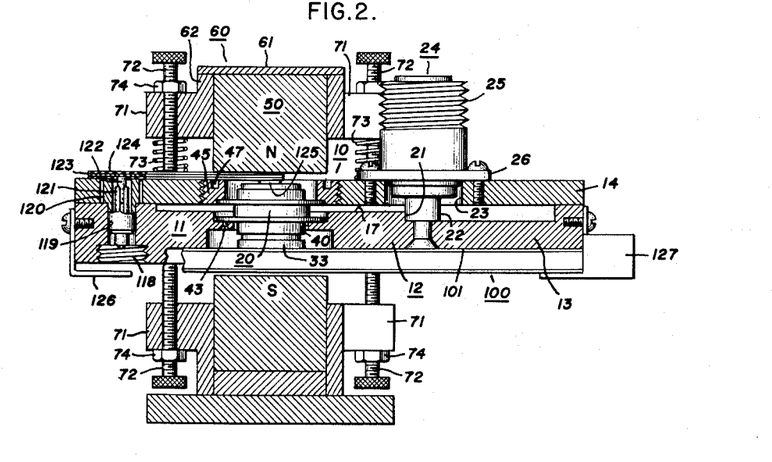
FIGURE 2 is a sectional view taken along the lines 2—2 of FIGURE 1 and illustrating the waveguide circuit mounted in the magnet holder.
Figure 3:
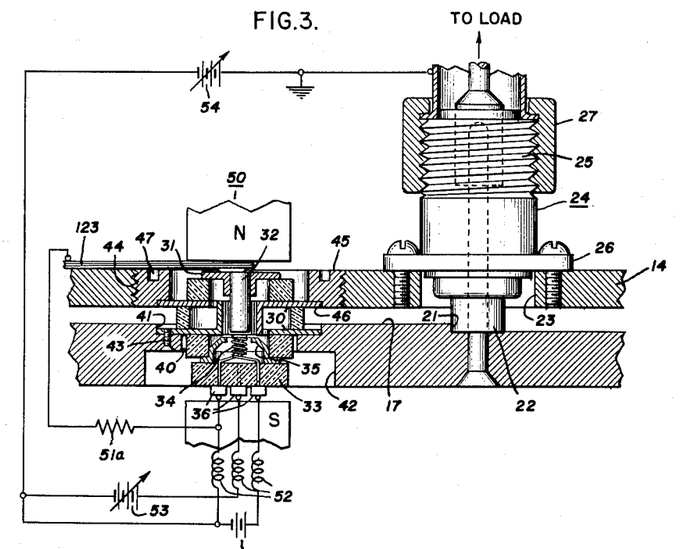
FIGURE 3 is a sectionalized, enlarged fragmentary and schematic illustration of the arrangement of FIGURE 2 and including illustrations of direct current circuitry employable therewith.

Referring to FIGURES 1, 2, and 3, there is shown an embodiment of my magnetron circuit apparatus including a waveguide circuit generally designated 10 and including a ridged waveguide region 11 and a ridged transition region 12. The circuit 10 comprises a rectangular, nonmagnetic, conductive body member 13 and a matching cover 14 suitably secured to the body member as by machine screws 15.

The body member 13 is machined to include a spaced pair of parallel, longitudinally extending recesses 16, whereby a ridge 17 is provided in the circuit. The upper surface of the ridge 17 is spaced from the underside of the cover 14 in the ridged waveguide region 11 an amount corresponding generally to the spacing between the anode ring contacts of an interdigital magnetron 20, which will be described in greater detail hereinafter.

In the transition region 12 the ridge 17 includes a step 21 and suitably mechanically and electrically connected to the ridge 17 at the step 21 is a vertically extending conductor 22. The conductor 22 extends through an aperture 23 in the cover 14 and comprises the central conductor of a coaxial line connector 24. The connector 24 includes a threaded outer conductor 25 having a flange 26, whereby the connector is suitably secured electrically and mechanically to the cover 14 over the aperture 23 therein. The connector 24 is adapted for making electrical connection with a coaxial transmission line of the type schematically illustrated in FIGURE 3 and designated 27, whereby radio frequency power can be connected to a useful load.

The magnetron 20 can be of the type disclosed and claimed in the above-mentioned U.S. patent of G. J. Griffin et al. assigned to the same assignee as the present application. Briefly, and as seen in FIGURE 3, this type of magnetron comprises an evacuated envelope constituted of a stacked assembly of alternately arranged metal and ceramic members sealed together by suitable ceramic-to-metal bonds. The metallic members include a spaced pair of anode contact rings 30 which support, internally of the envelope, an interdigital array of anode segments. A metallic end cap 31 closes the upper end of the envelope and supports a cold or non-emissive cathode element 32 in the cylindrical region defined by the anode segments. A ceramic disk 33 closes the opposite end of the envelope and supports a bifilar contrawound emitter 34. Surrounding the emitter 34 is a frustoconical control electrode 35 adapted for controlling the axial movement or injection of electrons from the emitter 34 into an interaction space defined by the cold cathode and anode segments. A conductive lead to the control electrode 35 extends through the disk 33 as do leads to the opposite ends of the emitter 34. Brazed to the underside of the disk 33 are conductive contact buttons 36 each of which is connected electrically to one of the emitter or control electrode leads.

The ridged waveguide region 11 of the circuit 10 is adapted for having the magnetron 20 mounted therein. Specifically, and as seen in FIGURES 1-3, the ridge 17 is apertured in the ridged waveguide region 11 at 40 and is provided with upper and lower counterbores 41 and 42, respectively. The upper counterbore 41 is just slightly larger than the lower one of the anode contacts 30 and receives same therein. The lower counterbore 42 is larger to afford substantial electrical spacing between the body member 13 of the waveguide circuit 10, which is at anode potential and the contact buttons 36 on the magnetron, thus to avoid electrical breakdown therebetween. A screw 43 shown in FIGURE 2 is provided for extending through the circuit base member 13 at the rim of the aperture 40 and into a suitably threaded aperture in the lower contact ring of the magnetron, thereby to retain the magnetron in a predetermined rotationally oriented position in circuit.

As seen in FIGURES 1-3, the cover 14 is provided with an aperture 44 which is coaxial with the aperture 40 and has screwed therein a mounting ring 45. The mounting ring 45 includes a counterbore 46 for receiving and electrically contacting the upper anode contact ring 30. The mounting ring 45 can be screwed into the magnetron retaining position illustrated by any suitable tool that can engage holes 47 in the mounting ring, such, for example, as a spanner wrench. The particular means for mounting the magnetron is not critical so long as it maintains one of the magnetron contact rings substantially coplanar with the ridge 17 and the other contact ring substantially coplanar with the interior of the waveguide side opposite the ridge 17, or in other words, the inner surface of the cover 14, and provides satisfactory radio frequency contact between the magnetron and waveguide circuit.

The magnetron 20 is adapted for operating in the circuit 10 in conjunction with a static substantially axially extending magnetic field of the order preferably of approximately 2500 gauss. This magnetic field is produced in the present embodiment by a magnet generally designated 50 and including a pair of opposed closely spaced pole pieces designated N and S disposed adjacent the end cap 31 and contact buttons 36, respectively, of the magnetron 20. The magnet 50 comprises part of a particular magnet structure and adjustable holder therefor, one form of which is illustrated in FIGURE 2 and which also will be described in detail hereinafter.

Referring again to FIGURE 3, a filament voltage supply 51 which can be approximately 3 volts is provided for energizing the emitter 34. The leads whereby the filament supply is connected to the opposite ends of the emitter each include a choke coil 52 for minimizing radio frequency losses therethrough. Inasmuch as the cold cathode 32 and the emitter 34 are physically and electrically spaced in the magnetron 20 it is desirable that these electrodes be connected electrically externally of the magnetron. This is accomplished by a lead extending from the cap 31 to one of the filament leads through a resistor 51a of approximately 1,000 ohms. This enables the cold cathode and emitter to operate at predetermined different potentials.

An adjustable control voltage supply 53 which can be 200 to 500 volts is provided for selectively determining the control electrode voltage, thereby to determine the amount of electrons injected into the interaction space. Provided in the control electrode supply lead is a choke coil 52 which also serves to minimize undesirable radio frequency losses therethrough.

An adjustable anode voltage supply 54 which can be approximately 1200 volts is connected to the outer conductor of the coaxial line 27 and is provided for determining the operating frequency of the magnetron.

When the magnetron 20 is connected in a direct current supply circuit of the type just described, the output power level of the device can, as brought out in detail in Patent No. 2,810,096, be predeterminedly varied by adjusting the control electrode voltage, and the frequency of oscillation can be linearly varied by adjusting the anode voltage.

In order to obtain power from the magnetron 20, it is necessary to present a real radio frequency impedance between the two anode contact rings 40. The value of this impedance determines the power output of the tube and, in the case of voltage tunable magnetrons, this impedance also determines the frequency bandwidth of operation. In the circuitry described to this point, the coaxial line 27 is of a predetermined characteristic impedance such, for example, as 50 ohms and the waveguide circuit 10 is constructed to constitute an impedance matching section which provides the required impedance for affording maximum power transfer efficiency and broadband operation.

Figure 6:
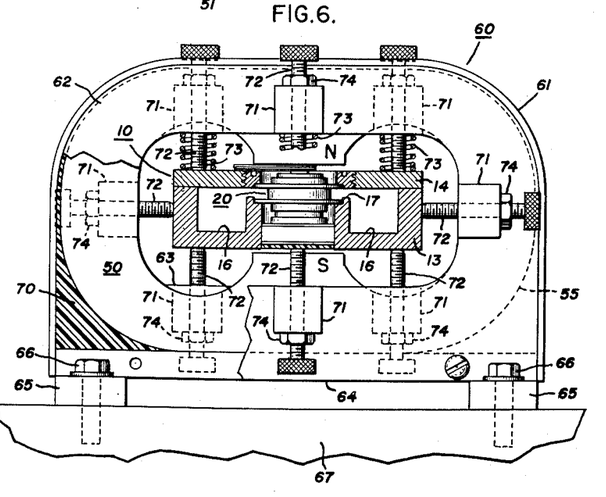
FIGURE 6 is a side elevational view of the arrangement of FIGURE 2 in which the waveguide circuit is sectionalized to illustrate the arrangement for mounting the magnetron in the waveguide circuit.

I have found that the power output or operating efeach side member 62 includes a pair of left and right side lugs 71 in which are threadedly mounted horizontal and oppositely-extending adjustment screws 72. The upper and lower vertically extending screws are adapted for engaging the cover and body member, respectively, of the waveguide circuit 10 and fitted over the upper ones of these screws are non-magnetic coil springs 73 which engage the waveguide circuit and lugs. The horizontally extending screws are adapted for engaging the respective sides of the waveguide body. Additionally, each of the said screws carries threaded thereon a locking nut 74 adapted for being turned into engagement with the lugs 71, thereby to lock the screws 72 in any desired adjusted position.

In practice the magnetron 20 is securely mounted in the waveguide circuit 10 and adjustment of the magnetron relative to the magnetic field between the pole pieces N and S is effected by first turning out the set screws 72 until the waveguide circuit 10 is free to move in all directions and is engageable only by the springs 73 which tend to bias the circuit into engagement with the lower set screws. Then the circuit is moved in any direction necessary to obtain desired alignment of the magnetic field and the magnetron. This is generally accomplished with the aid of electronic test equipment which by indicating maximum power output, for example, indicates when desired alignment has been obtained. This desired alignment is held, as by use of precision fixture equipment, until the set screws 72 are turned in sufficiently to hold the cavity in the position in which desired alignment is attained. Thereafter, the locking nuts 74 can be turned down against the lugs 71 to hold the acquired adjustments. Alternatively, a cementitious staking compound can be used which will serve to seize the screws in the desired adjusted positions.

Figure 7:
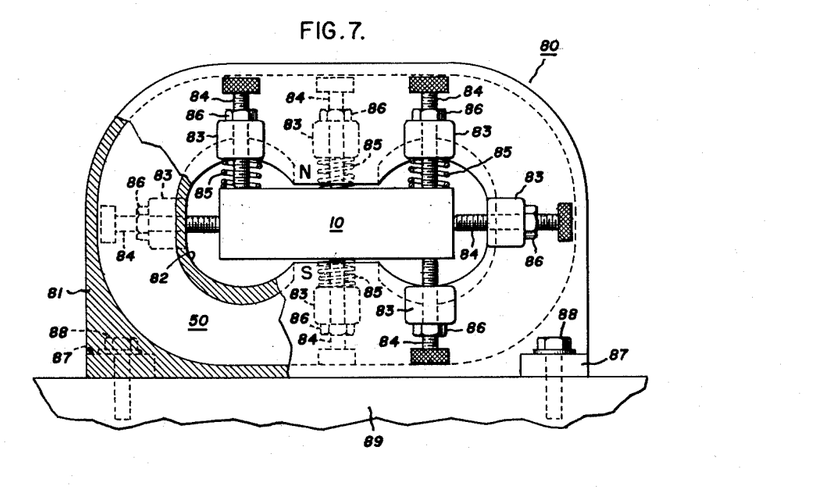
FIGURE 7 is a side view of a modified form of magnet holder and is partially sectionalized to facilitate understanding of the construction thereof.

Illustrated in FIGURE 7 is a modified magnet holder generally designated 80 and adapted for accomplishing the same purpose as that illustrated in FIGURES 2 and 6. The holder 80 of FIGURE 7 comprises a casting of non-magnetic material formed about a magnet 50. The casting 81 can comprise, for example, cast aluminum and, as illustrated, includes a central opening 82 for extension therethrough of the waveguide circuit 10. Additionally, the casting 82 includes integrally formed adjustment screw lugs 83 for carrying adjustment screws 84. Springs 85, identical in structure and purpose to those of the previously described holder, are carried on the upper or downwardly extending adjustment screws 84. Lock nuts 86 are carried on each of the screws between the heads thereof and the lugs 83. Lugs 87 cast on a base portion of the casting 81 carry hold-down screws 88, whereby the holder 80 may be securely mounted to a support 89. The location of the various adjustment screws and steps of effecting the adjustment of the waveguide circuit 10 and the magnet holder and, therefore, the adjustment of the magnetron carried in the circuit relative to the pole pieces of the magnet 50, can be identical to that described above with respect to the holder 60 of FIGURES 2 and 6.

Figure 8:
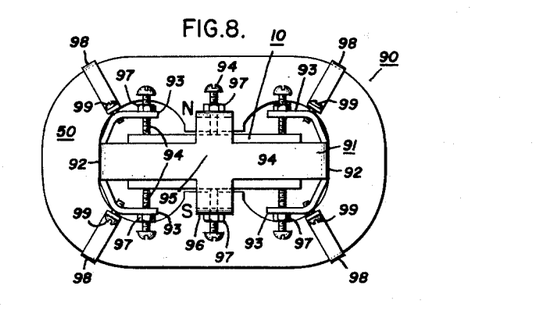
FIGURE 8 is a side elevational view of another modified form of magnet holder.
Figure 9:
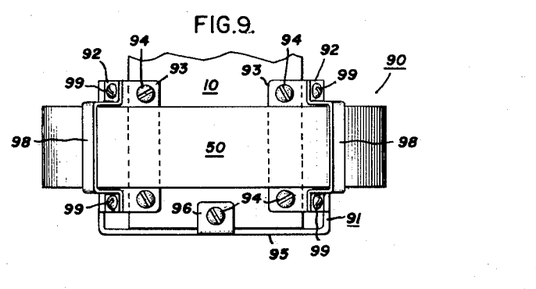
FIGURE 9 is a plan view of the modified holder of FIGURE 8.

Illustrated in FIGURES 8 and 9 is another modified embodiment of magnet holder generally designated 90. The holder 90 constitutes an embodiment fabricated of a plurality of strap-like elements. Specifically, the holder 90 comprises a generally U-shaped yoke 91 adapted for fitting in the central aperture of a magnet 50 and about one end of the waveguide circuit 10. Each side leg portion 92 includes an inwardly extending substantially wide tab 93 on the upper and lower sides thereof. These tabs extend over and under respective side portions of the waveguide circuit 10 and carry at the corners thereof inwardly extending adjustment screws 94 for being turned into and out of engagement with the waveguide circuit 10 for holding the circuit and, therefore, the magnetron mounted in the circuit, in selective adjusted positions relative to the opposed pole pieces of the magnet 50. Additionally, the bight or interconnecting portion 95 of the yoke 91 includes at its upper and lower edges inwardly extending tabs 96 carrying adjustment screws 94 which are also adapted for being turned into and out of engagement with the waveguide circuit for adjustment purposes. Locking nuts 97 are provided on all of the screws 94 to enable locking of the adjustment screws in any desired set position.

The yoke 91 is held in place by four U-shaped strap members 98, each of which straddles a corner portion of the magnet 50 and is fastened to the tab portions 93 by machine screws 99. It will be seen that this structure is particularly adapted for ease and simplicity of manufacture and of easy assemblage to the magnet 50. In a manner substantially similar to that described above with reference to the previously described embodiments, a waveguide circuit 10 can be adjustably positioned in the holder of FIGURES 8 and 9, thereby to align adjustably the magnetic field between the poles of the magnet and the axis of a magnetron mounted in the circuit. After an adjusted position is attained the locking nuts 97 can be turned down into engagement with the tabs 93 for locking the screws 94 in the adjusted positions thereof.

I have also found that power output can in some applications be increased by providing a substantial magnetic field component extending transverse to the longitudinal axis of the magnetron 20. This apparently has a beneficial effect of directing electrons comprising the cloud rotating in the interaction region between the cold cathode and anode segments into closer cooperation with the latter and thereby effecting increased power output. This effect is most beneficial in broadband types of circuitry.

Figure 10:
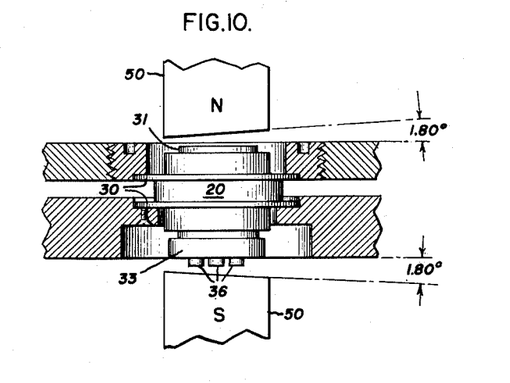
FIGURE 10 is an enlarged fragmentary sectionalized view of a modification of the magnet structure.

I have found that a power increasing effect can be accomplished by predeterminedly shaping the faces of the opposed pole pieces N and S of the magnet 50 to barrel or bow the flux lines. For example, and as illustrated exaggeratedly in FIGURE 10, the magnet pole faces can be ground or otherwise shaped to extend at an angle of approximately 1.8° relative to the horizontal axis extending through the circuit. This, as can various other shapings of the pole pieces, can effect a magnetic component extending transverse the axis of the magnetron for effecting power increases in the manner described above.

As brought out above in reference to FIGURE 3, my arrangement includes improved means for making the various direct current power connections to the various electrodes of the magnetron 20 mounted in the waveguide circuit 10. These direct current power connecting means are illustrated in detail in FIGURES 2, 11 and 11 and are adapted for meeting several substantially stringent requirements. Specifically, and as also brought out above, voltage tunable magnetrons require a magnetic field for operation and in order to maintain minimum magnet size, it is essential to utilize a minimum air gap between the pole pieces of the magnet. Some of the mentioned direct current power and filament connections are, as mentioned above, made through contact buttons 36 on one end of the tube which are at as much as 2,000 volts potential difference to ground. Thus, the direct current connector is required to provide insulation against approximately 2,000 volts potential difference with minimum thickness of insulative material. The tube filament or remitter 34 requires a current of approximately 3 amperes and this necessitates satisfactory contact pressure to avoid heating at the contacts, thereby to avoid formation of high-resistance oxide interfaces between the contacts. Additionally, the magnetron 20 is adapted for high operating temperatures in the order of 200 degrees centigrade. Thus, some cooling action, as by heat conduction, must be afforded through the connector contacts in order to avoid localized overheating of the tube seals which could cause same to fail and thus destroy the magnetron.

In order to meet the several above-noted requirements I have provided a connector generally designated 100. The connector 100 comprises an elongated rectangular ficiency of voltage tunable magnetrons can be maximized by insuring that the circuit does not resonate at the center frequency of a desired operating frequency band and that the load impedance required to operate such magnetrons is of a capacitive nature over the entire operating frequency range.

Below resonance a tuned circuit becomes inductive. In my arrangement the magnetron 20 behaves as an inductive element and the ridge waveguide circuit appears as a capacitive load at the magnetron. The appropriate dimensioning of the waveguide circuit can be accomplished by calculating the impedance of each section of the ridge waveguide while assuming that the coaxial connector is terminated in, for example, a 50 ohm load with a voltage standing wave ratio of 1.0. These impedances can then be combined with the load and by use of well-known transmission line theory transferred back to the tube center line. Calculations can be made, for example, at 100 mc. intervals across the desired operating frequency band. There appears to be no known simple method of calculating the lengths of various portions of the circuit starting with the desired impedance. Thus, I have found it expedient to derive the circuit dimensions empirically, first selecting various dimensions on the basis, for example, of physical size, bandwidth requirements and tube dimensions. Then by varying some of these selected dimensions and noting the effect on impedance across the desired operating frequency band, and after several trials I have obtained a waveguide circuit which had the desired capacitive component. A broadband circuit has been constructed in this manner and operated successfully across the entire operating frequency range of 2000 to 4000 mc. band.

A tunable short-length broadband circuit has also been constructed in the manner described and this circuit has been effective for optimizing the lengths of the circuit with a view toward obtaining maximum efficiency with minimum power variations across the operating frequency range. This circuit is illustrated in FIGURE 1 and one other assumption was made in arriving thereat. With low anode voltages and current at the lower frequencies, it was assumed that efficiency of operation would be less satisfactory and hence the circuit would have to be more efficient in this range. This resulted in the selection of a component of high resistance at 2000 mc. and which would drop toward a minimum at 4000 mc. This selection was made to correct, in part, for the increase in efficiency of the magnetron at high voltages and to secure a more constant level of output power. Substantially the same approach can be used in arriving at appropriate circuit dimensions for substantially any given portion of band frequencies, including circuits adapted for narrow band operation. In utilizing this approach substantially satisfactory results have been obtained when efforts have been made to maintain the resistive component as high as physically possible and the reactance component such that the tube operation will be optimized.

Figure 4:
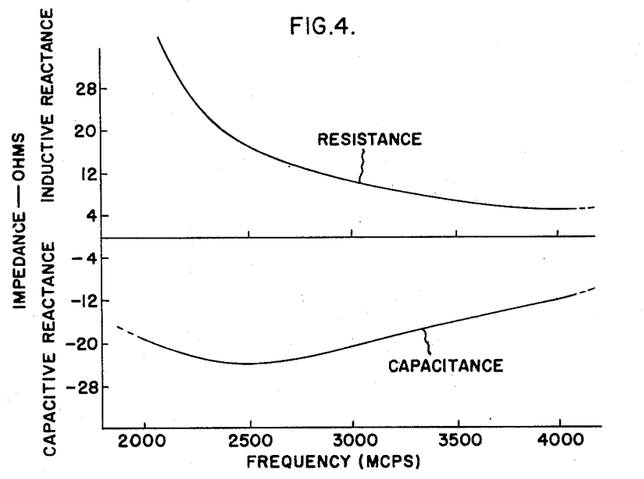
FIGURE 4 is a chart illustrating the impedance curves of a preferred embodiment of the waveguide circuit.

By predeterminedly dimensioning the waveguide circuit 10 in the manner described above, it is possible to adapt the circuit for having an impedance characteristic substantially as illustrated in FIGURE 4. The curves of FIGURE 4 show a resistance component which is substantially high at 2,000 mc. and which drops exponentially to a lower value at 4,000 mc. The dimensioning on the various parts of the ridge waveguide circuit are such that when they are transferred to the tube center line as seen by the tube maintains a phase angle of approximately 45 degrees. As is shown in FIGURE 4, the circuit represented remains capacitive over the entire operating range of from 2,000 mc. to 4,000 mc.

Figure 5:
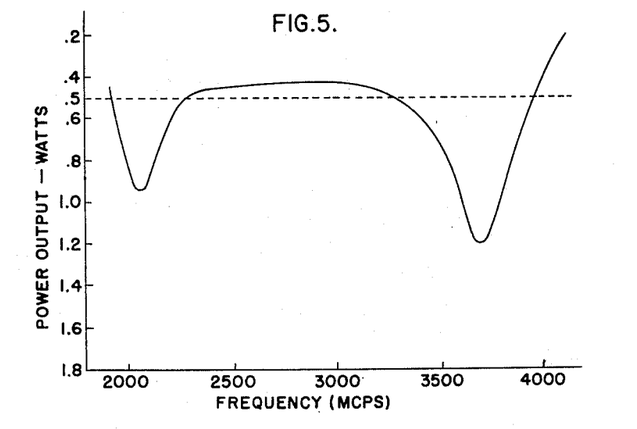
FIGURE 5 is a chart illustrating the power output obtainable with a circuit having impedance curves of the types illustrated in FIGURE 4.

Now, referring to the power output curve of FIGURE 5, it is seen that with a voltage tunable magnetron such as the device 20 operating in a waveguide circuit such as that designated 10 which is dimensioned to provide a capacitive reactance over an entire operating frequency range, such for example, as the range of 2,000 mc. to 4,000 mc., it is possible to obtain an essentially flat power curve and one with substantial average power output in excess of half a watt over the range of 2,000 mc. to 4,000 mc. It will be noted by reference to FIGURES 4 and 5 that the efficiency of power transfer depends on the capacitive value of the load impedance and that power output is notably higher in those frequency regions where the load impedance is predominantly of a capacitive nature.

As pointed out above, the operation of the magnetron 20 in the circuit 10 requires a static, substantially axially extending magnetic field for operation. It is exceedingly important to proper operation of the circuit and maximum power output that the flux lines of the magnetic field between the pole pieces of the magnet be precisely adjustable relative to the magnetron axis. This requires adjustable movement of the field in every possible direction with respect to the magnetron axis.

Illustrated in FIGURES 2 and 6 is one embodiment of an improved magnetron structure including magnet holding and precision adjusting means. This structure includes the above-referenced magnet 50 which is of the permanent type and includes the opposed N and S pole pieces joined on each side thereof by a bight or looplike portion 60. The magnet 50 can be cast or otherwise formed of alnico or any like high magnetic strength material and can comprise a single piece member or can be fabricated to assume the configuration illustrated. The magnet can be cast in two parts and then welded together to provide a unitary structure. The welded joint between the two parts can be a source of weakness and the holders to be described hereinafter serve also as reinforcement means.

As perhaps better seen in FIGURE 6, the magnet 50 is adapted for receiving and having positioned therein the waveguide circuit 10 in which the magnetron 20 is mounted in the manner described above. The axial length of the magnetron is relatively short and, due to the desirability of obtaining a dense concentration of flux lines through the magnetron, the thickness of the cavity and the direct current connections thereof, which will be described in detail hereinafter, are reduced to a minimum, thereby to enable the pole pieces of the magnet to be spaced as closely as possible to effect the desired flux density. Additionally, in the embodiment illustrated in FIGURES 2 and 6 the opposed faces of the pole pieces are parallel to facilitate coaxial alignment of the magnetic field and magnetron where desired.

In the circuit 10 the magnetron is substantially precisely and rigidly held and, thus, it is possible to obtain desirable alignment of the magnetron axis and magnetic field between the magnet poles N and S by moving the waveguide circuit 10 relative to the magnet. To accomplish this, I have fixedly mounted the magnet in a holder generally designated 60 in FIGURES 2 and 6. The holder 60 includes a casing comprising a U-shaped cover member 61 and a pair of spaced side members 62 apertured at 63 to permit extension through of the waveguide circuit 10. The members 61 and 62 are all formed of a non-magnetic material and are suitably mounted on a base 64 which includes means such as mounting lugs 65 and screws 66 for securing the holder to a suitable support 67. The magnet 50 is held fixedly in the holder by a non-magnetic potting compound such, for example, as an epoxy resin indicated at 70.

As also seen in FIGURES 2 and 6, one of the side members 62 of the holder 60 includes a pair of upper and lower lugs 71 formed in line with the axis of the pole pieces and having threaded therein non-magnetic, vertical, oppositely-extending adjustment screws 72. The other side member 62 includes a pair of such upper and lower lugs 71 and oppositely-extending, vertical adjustment screws 72 on either side of the magnet pole pieces. Additionally, element which fits slidingly in an elongated longitudinally extending slot 101 machined in the underside of the body member 13 of the waveguide circuit 10 just below and coextensive with the ridge 17. The connector 100 includes a body member 102 and a pair of thin sheet-like upper and lower cover elements 103 and 104, respectively. These elements are all formed by a high-refractory highly insulative and mechanically strong material. I have found silicone bonded fiberglass board particularly adapted for use in forming these elements inasmuch as this material meets satisfactorily the necessary electrical and temperature requirements and also possesses the high mechanical strength required.

Figure 11:
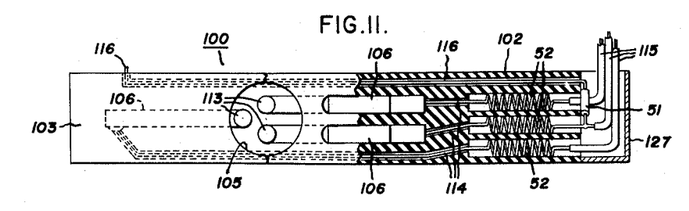
FIGURE 11 is a partially sectionalized plan view of one of the direct current connectors.
Figure 12:
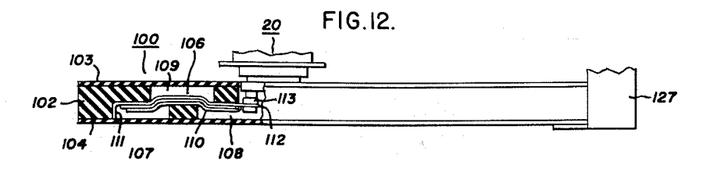
FIGURE 12 is a partially sectionalized elevational view of the connector of FIGURE 11.

As seen in FIGURES 11 and 12, the body member 102 and the upper cover element 103 are formed to include registering central openings which are jointly designated 105 and receive the lower end of the mounted magnetron 20 when the connector 100 is placed in the slot 101 in the underside of the waveguide circuit 10. This disposes the contacts 36 on the lower end of the magnetron in the connector 100 and electrical contact is made thereto by a plurality of spring contact assemblies generally designated 106. The contact assemblies 106 are identical in structure and, accordingly, it will be necessary to describe in detail the structure of only one thereof. This, in conjunction with the drawing, will be adequate to enable the reader to understand the structure of all three such assemblies and the manner in which these assemblies make suitable contact with the buttons 36 on the magnetron.

Extending into the underside of the body member 102 is a pair of longitudinally elongated and spaced recesses 107 and 108. The recess 108 extends into the central opening 105. Extending into the upper side of the body member 102 is an elongated slot 109 which communicates with the slots 107 and 108. Fitted in the tortuous passage defined by the slots 107, 108, and 109 is a plurality of superposed leaf springs 110 which constitute the contact assembly 106. These springs 110 are bent to facilitate insertion thereof in the various slots making up the tortuous passage mentioned above and the uppermost spring includes one end having a downturned tab 111 which engages the outer end of the slot 107 and an oppositely disposed extension 112 which is disposed in the opening 105 and carries thereon a low resistance contact button 113 formed, for example, of silver. The button 113 is adapted for engaging resiliently one of the contact buttons 36 on the magnetron 20 and the lower ones of the leaf springs 110 are effective for increasing the resistance of the extension 112 to bending when the contact button 113 is in contact with the magnetron button 36.

The material of which the springs 110 are formed must be non-magnetic, a high heat conductor, and must be adapted for operating in an environment of the order of 200 degrees centigrade without losing its temper. Beryllium copper and Inconel-x have been found suitable in that they satisfactorily meet these various requirements. The just-described arrangement provides contact for the contact buttons 36 of the magnetron and, as seen in FIGURE 11, the contact buttons 113 are arranged in a generally triangular array with two of the spring assemblies 106 extending toward one end of the connector 100 and one extending toward the other end. Each of the contact assemblies 106 is connected by a lead 114 extending through a suitable passage in the body member 102 to an enlarged recess wherein it is connected to one of the above-mentioned radio frequency choke coils 52 on the other ends of which are connected leads 115 for making connection to the various power sources.

As pointed out above in reference to FIGURE 1, electrical connection is made between the cold cathode 32 and one side of the filament or emitter 34 through a resistor 51a in order to enable these elements to operate at predetermined slightly different potentials. The actual connection between these elements is made by a lead 116. One end of the lead 116 extends through a suitable elongated passage in the body member 102 of the connector 100 and is connected through the resistor 51a, which is located beyond the one end of the connector, to one of the filament leads 115. The other end of the lead 116 extends through a radial opening 117 in an insulative plug 118 threaded in a counterbore of a bore 119 (FIGURE 1) which extends vertically through the body member 13 and cover 14 of the waveguide circuit 10. Fitted in the bore 119 is an insulative plug 120 carrying a pronged conductive receptacle 121 (FIGURE 2) electrically connected to the lead 116. The pronged receptacle removably receives a conductive plug 122 carried by a conductive leaf 123 suitably enclosed in an insulative sheaf 124 which may also be formed of silicone bonded fiberglass board. The sheaf 124 is dimensioned for being tightly fitted between the cap 31 of the magnetron and the face of the pole piece N of the magnet 50. The underside of the sheaf is apertured for extension therethrough of a contact button 125 which makes contact between the conductive leaf 123 and the cap 31, thereby to complete a circuit between the cold cathode and one side of the emitter.

The connector 100, as mentioned above, is fitted slideably into the slot 101 in the underside of the waveguide circuit 10. The connector 100 is held in place in this slot at one end by a bracket 126 suitably supported on the waveguide circuit. The other side of the connector 100 is held by a box-like element 127 which is suitably supported on the opposite end of the circuit and serves to hold the connector in place, to enclose the resistor 51 and to protect the connection between the leads 115 and the choke coils 52 and to direct the former laterally out of the structure at one location.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. A unitary magnetron circuit apparatus comprising a magnet including a pair of opposed closely spaced pole pieces, a cavity circuit positioned between said pole pieces, means for mounting a magnetron in said circuit with the longitudinal axis of said magnetron substantially coextensive with the magnetic field between said pole pieces, and means carried by said magnet supporting said circuit on said magnet and adjustable for predeterminedly positioning said circuit relative to said pole pieces, thereby to adjust said magnetic field position relative to the longitudinal axis of a magnetron mounted in said circuit.

2. A unitary electric discharge device system comprising a magnet including a pair of opposed closely spaced pole pieces interconnected on either side thereof by a loop-like portion, a waveguide circuit positioned between said pole pieces and including a ridged waveguide region, an interdigital magnetron including coaxial, longitudinally spaced interaction and electron injection structure mounted in said ridged waveguide region with the longitudinal axis of said magnetron substantially coextensive with the magnetic field between said pole pieces and such that the output from said magnetron appears between the ridge and opposite side of said waveguide, and a coaxial line output connector having a central conductor, said connector being joined to said waveguide with said central conductor electrically contacting said ridge, and means carried by said magnet supporting said circuit on said magnet and engageable with said circuit at a plurality of different points thereon for adjustably positioning said circuit relative to said pole pieces, thereby to adjust said magnetic field position relative to the longitudinal axis of a magnetron mounted in said circuit.

3. Interdigital magnetron circuit apparatus comprising a magnet including a pair of opposed closely spaced pole pieces, a waveguide circuit positioned between said pole pieces and including a ridged waveguide region, means for mounting an interdigital magnetron having electrode contacts at one end thereof in said ridged waveguide region with the longitudinal axis of said magnetron substantially coextensive with the magnetic field between said pole pieces, a recess in said waveguide circuit beneath the ridge of said ridged waveguide region, and contact means positioned in said recess between one end of a magnetron in said circuit and the adjacent pole piece for making electrical connections to electrode contacts on said one end of said magnetron.

4. Interdigital magnetron circuit apparatus comprising a magnet including a pair of opposed closely spaced pole pieces, a waveguide circuit positioned between said pole pieces and including a ridged waveguide region, means for mounting an interdigital magnetron having electrode contacts on the ends thereof in said ridged waveguide region with the longitudinal axis of said magnetron substantially coextensive with the magnetic field between said pole pieces, a recess in said waveguide circuit beneath the ridge of said ridged waveguide region, a first contact means positioned in said recess between one end of a magnet in said circuit and the adjacent pole piece for making electrical connections to electrode contacts on said one end of said magnetron, a second contact means positioned between the opposite end of a magnetron in said circuit and the adjacent pole piece for making electrical connection to an electrode contact on said opposite end of said magnetron, and an electrical interconnection between said first and said second contact means and extending through and insulated from said waveguide circuit.

5. Interdigital magnetron circuit apparatus comprising a magnet including a pair of opposed closely spaced pole pieces, a waveguide circuit positioned between said pole pieces and including a ridged waveguide region, means for mounting an interdigital magnetron having electrode contacts on the ends thereof in said ridged waveguide region with the longitudinal axis of said magnetron substantially coextensive with the magnetic field between said pole pieces, a recess in said waveguide circuit beneath the ridge of said ridged waveguide region, a first contact means positioned in said recess between one end of a magnetron in said circuit and the adjacent pole piece for making electrical connections to electrode contacts on said one end of said magnetron, a second contact means positioned between the opposite end of a magnetron in said circuit and the adjacent pole piece for making electrical connection to an electrode contact on said opposite end of said magnetron, an electrical interconnection between said first and said second contact means and extending through and insulated from said waveguide circuit, and means carried by said magnet and engageable with said waveguide circuit for adjustably positioning said circuit relative to said pole pieces, thereby to adjust said magnetic field relative to the longitudinal axis of a magnetron mounted in said circuit.

6. In magnetron circuit apparatus including a waveguide circuit, means for mounting a magnetron in said circuit with electrical contacts on an end of said magnetron extending through an opening in said circuit, an electrical connector comprising a high-refractory, insulative member including a central opening for registering with said opening in said circuit, and a plurality of high heat resistant, non-magnetic leaf springs, said springs being substantially enclosed by said member except for end portions extending into said central opening of said member for engaging said electrode contacts on a magnetron in said circuit.

7. In a magnetron circuit apparatus including a ridge wave guide circuit, means for mounting a magnetron in said circuit with electrical contacts on an end of said magnetron extending through an opening in said circuit, and an elongated slot formed in the underside of the ridge of said circuit and communicating with said aperture, an electrical connector comprising an elongated high-refractory, insulative member slideably positionable in said slot in said circuit, said member including a central opening for registering with said aperture in said circuit and a plurality of longitudinally extending tortuous passages connected each with said central opening, a spring assembly comprising a plurality of superposed high heat resistant, non-magnetic leaf springs positioned in each of said tortuous passages and held in position by the shape of said passages, an end of a spring of each of said assemblies extending in said central opening and carrying a low electrical resistance contact button for engaging said electrical contacts on a magnetron in said circuit, and an electrical lead connected to each of said spring assemblies through a radio frequency choke coil housed in said member.

8. In magnetron circuit apparatus including a pair of opposed magnetic pole pieces and a wave guide circuit having means for mounting a magnetron in said circuit between said pole pieces with an electrode contact on an end of said magnetron exposed, an electrical connector comprising a non-magnetic, conductive leaf slideably positionable between said electrode contact on said end of said magnetron and the adjacent pole piece, and an insulative sheaf dimensioned to provide a tight fit between said magnetron contact and said pole piece and apertured to afford electrical contact between said conductive leaf and said electrical contact on said magnetron.

9. In magnetron circuit apparatus including a pair of opposed magnetic pole pieces and a waveguide circuit having means for mounting a magnetron including a pair of filament contacts at one end and a non-emissive electrode contact on the opposite end in said circuit between said pole pieces with said contacts exposed, the combination comprising an electrical connector comprising a high-refractory, insulative member positionable between an end of a magnetron in said circuit and the adjacent pole piece and including a plurality of high-heat resistant, non-magnetic leaf springs for engaging said pair of filament contacts of a magnetron in said circuit, another electrical connector including a non-magnetic conductive leaf dimensioned for being tightly fitted between the opposite end of a magnetron in said circuit and the adjacent pole piece and effective for making electrical contact with the non-emissive electrical contact on said opposite end of said magnetron, and means including a resistor interconnecting one of said leaf springs of said first connector with said second connector.

10. A unitary electric discharge device system comprising a magnet including a pair of opposed closely spaced pole pieces interconnected on either side thereof by a loop-like portion, a radio frequency circuit structure positioned between said pole pieces, a magnetron including coaxial, longitudinally spaced interaction and electron injection structure mounted in said circuit structure with the longitudinal axis of said magnetron generally coextensive with the magnetic field between said pole pieces, and a non-magnetic magnet holder comprising a box-like construction having said magnet secured therein, said holder being apertured for extension of said circuit structure therethrough and carrying adjustment screws engageable with the top, bottom and sides of said circuit structure for supporting said circuit structure and adjustably positioning said circuit in planes both transverse and parallel to said magnetic field between said pole pieces, thereby to adjust predeterminedly the longitudinal axis of a magnetron mounted in said circuit relative to said magnetic field.

11. A unitary electric discharge device system comprising a magnet including a pair of opposed closely spaced pole pieces interconnected on either side thereof by a loop-like portion, a radio frequency circuit structure positioned between said pole pieces, a magnetron including coaxial, longitudinally spaced interaction and electron injection structure mounted in said circuit structure with the longitudinal axis of said magnetron generally coextensive with the magnetic field between said pole pieces, and a magnet holder comprising a casting of non-magnetic material on said magnet, said casting being apertured for extension of said circuit structure therethrough and carrying adjustment screws engageable with the top, bottom and sides of said circuit structure for supporting said circuit structure and adjustably positioning said circuit structure relative to said pole pieces, thereby to adjust predeterminedly the longitudinal axis of the magnetron mounted in said circuit relative to said magnetic field.

12. A unitary electric discharge device system comprising a magnet including a pair of opposed closely spaced pole pieces interconnected on either side thereof by a loop-like portion, a radio frequency circuit structure positioned between said pole pieces, means for mounting a magnetron in said circuit structure with the longitudinal axis of said magnetron substantially coextensive with the magnetic field between said pole pieces, and a magnet holder comprising a yoke of non-magnetic material positioned on said magnet, said yoke having said magnetron secured thereto by straps and including inwardly extending portions carrying adjustment screws engageable with top, bottom and sides of said circuit structure for supporting said circuit structure and adjustably positioning said circuit structure relative to said pole pieces, thereby to adjust predeterminedly the longitudinal axis of said magnetron mounted in said circuit structure relative to said magnetic field.

13. In combination, a voltage tunable magnetron including an interaction space defined by a plurality of interdigital anode segments and a non-emissive cathode and means for injecting electrons from an emitter axially into said interaction space, a magnet including a pair of opposed closely spaced pole pieces, a radio frequency circuit structure positionable between said pole pieces, means mounting said magnetron in said circuit structure with the opposite ends thereof each closely spaced from one of said magnet pole pieces, and means effecting a predetermined positional relationship between said magnet and magnetron wherein substantial components of the magnetic field between said pole pieces extend transverse the longitudinal axis of said magnetron.

14. In combination, a voltage tunable magnetron including an interaction space defined by a plurality of interdigital anode segments and a non-emissive cathode and means coaxial with and longitudinally spaced from said interaction space for injecting electrons from an emitter axially into said interaction space, a magnet including a pair of opposed closely spaced pole pieces, a radio frequency circuit positioned between said pole pieces, means mounting said magnetron in said circuit with the opposed ends thereof each closely spaced from one of said magnet pole pieces, and the opposed surfaces of said pole pieces being non-parallel and thereby effecting a predeterminedly shaped magnetic field between said pole pieces to provide substantial components of the field between said pole pieces which extend transverse the longitudinal axis of said magnetron, and said circuit being secured in a predetermined position wherein said predeterminedly shaped field between said pole pieces is predeterminedly oriented relative to the axis of said magnetron in said circuit.

15. An electric discharge device system comprising a voltage tunable magnetron including only a single resonator defined by a pair of sets of interdigital anode segments and a pair of spaced anode rings each carrying one of said sets of segments, said anode segments and a coaxial non-emissive cathode defining an interaction region and means longitudinally displaced from said interaction region for injecting electrons from an emitter axially into said interaction region; a magnet including a pair of opposed closely spaced pole pieces; a radio frequency circuit element including a pair of circular electrical contact surfaces; means securing said magnetron in said circuit element with said rings each electrically contacting one of said contact surfaces of said circuit element; and said circuit element being positioned between said pole pieces and secured to said magnet in a position wherein substantial components of the magnetic field between said pole pieces extend at a predetermined angle relative to the longitudinal axis of said magnetron for influencing said injection of said electrons toward said interaction region to increase the power output capabilities of said system.

16. An electric discharge device system comprising a voltage tunable magnetron including a single resonator defined by a pair of sets of interdigital anode segments and a pair of spaced anode rings, each carrying one of said sets of segments, said anode segments and a coaxial non-emissive cathode defining an interaction region and coaxial electron beam forming means including an emitter and a surrounding control electrode longitudinally displaced from said interaction region and adapted for directing electrons axially toward said interaction region; a magnet including a pair of oppositely disposed, closely spaced pole pieces; a radio frequency circuit element including a pair of circular electrical contact surfaces, means securing said magnetron in said circuit element with said rings each electrically contacting one of said contact surfaces of said circuit element; and said circuit element being positioned between said pole pieces and secured to said magnet in a position wherein substantial components of the magnetic field between said pole pieces extend transversely of the longitudinal axis of said electron beam forming means for influencing the injection of electrons toward said interaction region to increase the power output capabilities of said system.

References Cited in the file of this patent

UNITED STATES PATENTS

| | | |
|---|---|---|
| 2,142,345 | Braden | Jan. 3, 1939 |
| 2,444,435 | Fisk | July 6, 1948 |
| 2,585,741 | Clogston | Feb. 12, 1952 |
| 2,677,111 | Stahl et al. | Apr. 27, 1954 |
| 2,727,950 | Wise | Dec. 20, 1955 |
| 2,928,987 | Peters | Mar. 15, 1960 |